US011567696B2

(12) United States Patent
Yang et al.

(10) Patent No.: US 11,567,696 B2
(45) Date of Patent: Jan. 31, 2023

(54) CONTROL DEVICE OF STORAGE SYSTEM

(71) Applicant: Shenzhen Dapu Microelectronics Co., Ltd., Shenzhen (CN)

(72) Inventors: Jing Yang, Shenzhen (CN); Haibo He, Shenzhen (CN); Qing Yang, Shenzhen (CN)

(73) Assignee: SHENZHEN DAPU MICROELECTRONICS CO., LTD., Shenzhen (CN)

(*) Notice: Subject to any disclaimer, the term of this patent is extended or adjusted under 35 U.S.C. 154(b) by 108 days.

(21) Appl. No.: 16/440,979

(22) Filed: Jun. 13, 2019

(65) Prior Publication Data
US 2019/0294381 A1 Sep. 26, 2019

Related U.S. Application Data

(63) Continuation of application No. PCT/CN2017/100422, filed on Sep. 4, 2017.

(30) Foreign Application Priority Data

Feb. 21, 2017 (CN) .......................... 201710093959.8

(51) Int. Cl.
*G06F 3/06* (2006.01)
*G06F 9/54* (2006.01)
(Continued)

(52) U.S. Cl.
CPC ............ *G06F 3/0659* (2013.01); *G06F 3/061* (2013.01); *G06F 3/0604* (2013.01); *G06F 3/067* (2013.01);
(Continued)

(58) Field of Classification Search
CPC .... G06F 3/0659; G06F 3/0604; G06F 3/0607; G06F 3/061; G06F 3/0638; G06F 3/0658;
(Continued)

(56) References Cited

U.S. PATENT DOCUMENTS 8,930,364 B1* 1/2015 Brooker .................. G06F 16/40
707/736
9,591,096 B2* 3/2017 Kondo ................ H04L 67/5682
(Continued)

FOREIGN PATENT DOCUMENTS

CN 103608762 A 2/2014
CN 105426119 A 3/2016
(Continued)

OTHER PUBLICATIONS

Wang, Jun; "Learning to hash for indexing big data—A survey;" IEEE; Dec. 18, 2015; available at: https://ieeexplore.ieee.org/abstract/document/7360966.*
(Continued)

*Primary Examiner* — Prasith Thammavong
(74) *Attorney, Agent, or Firm* — Bayes PLLC

(57) ABSTRACT

The present disclosure discloses a control device of data storage system, including a host interface, a peer interface, a storage unit interface, a processor and a local data management module. The host interface is connected and communicated with a storage server for data interaction with the storage server. The peer interface is configured for data communication connection with a storage unit of an adjacent control device in the data storage system. The storage unit interface is configured to connect a storage unit. The local data management module is configured for local data management of the data in the storage unit according to the data management instruction via the processor. The host interface is configured to send result data of local data management to the storage server.

20 Claims, 5 Drawing Sheets

(51) Int. Cl.
*G06F 12/121* (2016.01)
*G06F 12/14* (2006.01)
*G06F 13/16* (2006.01)

(52) U.S. Cl.
CPC .......... *G06F 3/0607* (2013.01); *G06F 3/0638* (2013.01); *G06F 3/0658* (2013.01); *G06F 9/547* (2013.01); *G06F 12/121* (2013.01); *G06F 12/1408* (2013.01); *G06F 13/1668* (2013.01); *G06F 13/1694* (2013.01); *G06F 2212/1044* (2013.01); *G06F 2212/1052* (2013.01)

(58) Field of Classification Search
CPC ........ G06F 3/067; G06F 9/547; G06F 12/121; G06F 12/1408; G06F 13/1668; G06F 13/1694; G06F 2212/1044; G06F 2212/1052
See application file for complete search history.

(56) References Cited

U.S. PATENT DOCUMENTS

| | | | | | |
|---|---|---|---|---|---|
| 2006/0248292 | A1* | 11/2006 | Suresh | .................. | G06F 3/0655 711/154 |
| 2007/0220200 | A1* | 9/2007 | Gill | ...................... | G06F 12/123 711/113 |
| 2008/0253199 | A1* | 10/2008 | Torabi | .................... | G06F 3/061 365/189.05 |
| 2010/0174853 | A1* | 7/2010 | Lee | .................... | G06F 12/0246 711/103 |
| 2011/0040771 | A1* | 2/2011 | Gilyadov | .............. | G06F 13/385 707/754 |
| 2011/0153884 | A1* | 6/2011 | Shimotaya | ............ | G06F 3/0611 710/106 |
| 2011/0167102 | A1* | 7/2011 | Matzkel | .................. | H04L 67/22 709/202 |
| 2014/0244609 | A1* | 8/2014 | Dong | ..................... | G06F 16/95 707/706 |
| 2014/0351188 | A1* | 11/2014 | Bagg | ....................... | G06N 3/02 706/21 |
| 2015/0074337 | A1* | 3/2015 | Jo | ......................... | G06F 3/0679 711/103 |
| 2015/0281390 | A1* | 10/2015 | Kovvuri | ............. | H04L 67/2842 709/203 |
| 2015/0370492 | A1* | 12/2015 | Satnur | ..................... | G06F 3/061 711/114 |
| 2017/0262204 | A1* | 9/2017 | Dornemann | ........ | G06F 11/1484 |
| 2018/0321876 | A1* | 11/2018 | Ballapuram | .......... | G06F 3/0659 |
| 2019/0095493 | A1* | 3/2019 | Bhattacharjee | ... | G06F 16/24554 |
| 2019/0102675 | A1* | 4/2019 | Biswas | ................ | G06N 3/0445 |
| 2019/0108145 | A1* | 4/2019 | Raghava | ............... | G06F 13/124 |
| 2019/0155737 | A1* | 5/2019 | He | ......................... | G06F 3/0679 |

FOREIGN PATENT DOCUMENTS

| | | | |
|---|---|---|---|
| CN | 105446895 | A | 3/2016 |
| CN | 106227471 | * | 12/2016 |
| CN | 106227471 | A | 12/2016 |
| CN | 106250064 | A | 12/2016 |
| CN | 106951181 | A | 7/2017 |

OTHER PUBLICATIONS

Onsman, Alex; "Remote Procedure Call;" Tutorial Point; Oct. 11, 2018; available at: https://www.tutorialspoint.com/remote-procedure-call-rpc.*

Wang, Jun; "Learning to Hash for Indexing Big Data—A Survey;" IEEE; Dec. 15, 2015; available at: https://ieeexplore.ieee.org/abstract/document/7360966 (Year: 2015).*

Onsman's; Alex; "Remote Procedure Call (RPC);" Tutorial Point; Oct. 11, 2018; available at: https//tutorialpoint.com/remote-procedure-call-rpc (Year: 2018).*

Office action issued in corresponding Chinese Application No. 201710093959.8, dated Feb. 27, 2018, 4 pages.

Office action issued in corresponding Chinese Application No. 201710093959.8, dated Nov. 1, 2018, 6 pages.

International Search Report issued in corresponding International Application No. PCT/CN2017/100422 with English translation, dated Dec. 7, 2017, 7 pages.

Written Opinion issued in corresponding International Application No. PCT/CN2017/100422 , dated Dec. 7, 2017, 4 pages.

* cited by examiner

CONTROL DEVICE OF STORAGE SYSTEM

CROSS-REFERENCE TO RELATED APPLICATION(S)

This present application is a continuation of International Application No. PCT/CN2017/100422, filed on Sep. 4, 2017, which claims priority to Chinese Patent Application No. 201710093959.8, filed on Feb. 21, 2017, and entitled "CONTROL DEVICE OF STORAGE SYSTEM," the entire contents of both applications are incorporated by reference.

TECHNICAL FIELD

This disclosure relates to the field of computer science, and more particularly to a control device of data storage system.

BACKGROUND

With the popularity of the Internet, and the rapid development of science and technology in various fields, such as Internet of Things (IoT) and Big Data Computing, the generation of data is also growing explosively, which makes the performance and efficiency of data storage systems in prior art unable to meet current demands gradually.

Specifically, the current data storage system needs to process an increasing amount of data, and the efficiency requirements for data processing are also increasing. In prior art, the data storage system is able to control the access and management of the data of the storage device in the whole data storage system through a control device set in a specific storage server.

Through research, the inventor of this application has found that prior art has at least the following limitation.

The performance and efficiency of data storage system is constantly decreasing as the amount of data is constantly growing

SUMMARY

Disclosed herein are technical solutions to increase performance and efficiency of data storage system.

In accordance with a first aspect of the present disclosure, a control device of data storage system is provided. The control device of data storage system includes, a host interface configured to communicate with a storage server for data interaction with the storage server, the data interaction including receiving data management instruction of the storage server, a peer interface configured to communicate with a storage unit of an adjacent control device in the data storage system, a storage unit interface configured to connect a storage unit, a processor, a local data management module configured to manage the data of the storage unit based on the data management instruction via the processor, the host interface configured to send result data of data management to the storage server.

In some embodiments, the host interface includes one or any combination of interfaces of PCIe interface, SAS interface, SATA interface, RAPID-IO interface, and NVMe interface, and the storage unit interface includes one or any combination of interfaces of PCIe interface, SAS interface, SCSI interface and SATA interface, wherein the peer interface includes one or any combination of interfaces of Ethernet interface, FC interface, iSCSI interface and SAN interface.

In some embodiments, the control device of data storage system further includes a write control unit and a write cache module. The write cache module is configured to cache the data-to-be-written into a solid state drive (SSD). The write control unit includes a sort module and a write module. The sort module is configured to rank the data-to-be-written in the write cache module according to a least recently used page (LRU) algorithm and/or least frequently used page (LFU) algorithm, and determine a preset amount of replacement data among the infrequently used data-to-be-written according to a preset cache replacement algorithm. When data storage volume of the write cache module reaches a preset value, the write unit is configured to write the replacement data into a flash memory of the SSD.

In some embodiments, the write control unit further includes a grouping unit and a positioning unit. The grouping unit is configured to group the data-to-be-written. Grouping rules include grouping the data-to-be-written according to the interval at which the data-to-be-written are rewritten. The positioning module is configured to determine a target data block of the flash memory of the SSD according to the data group information of the replacement data.

In some embodiments, the control device of data storage system further includes a prefetch unit. The prefetch unit includes a hash table maintenance module, a data acquisition module, a first learning model and a prefetch module. The hash table maintenance module is configured to preset a hash table. The hash table includes more than one hash value, and the hash values are configured to record and indicate data characteristic of data pages in the SSD. The data characteristic wherein includes accessing history data of the data pages, current I/O operation type and address of the data pages, access frequency of the data pages, re-reference interval of the data pages, and data group of the data pages, and file name, file type and file size of the file to which the data pages belong. The data acquisition module is configured to acquire I/O data flow of the SSD and the hash value corresponding to the I/O data flow in the hash table. The first learning model is configured to predict data-page-to-be-visited, and the first learning model is input with data characteristic in the first data characteristic set as input. The first data characteristic set is a set of data characteristics required to acquire prediction result of the first learning model, and the data characteristic of the first data characteristic set is acquired according to the hash value. The prefetch module is configured to prefetch the data in the SSD based on output result of the first learning model.

In some embodiments, the control device of data storage system further includes a security unit. The security unit includes a sensitive data acquisition module and an encryption/decryption module. The sensitive data acquisition module is configured to acquire sensitive data during data interaction with the storage server, and the sensitive data include data conforming to predetermined characteristic. The encryption/decryption module includes a data security module adaptive to an encryption/decryption module of the storage server.

In some embodiments, the processor is configured to receive a service request of the storage server for data management via a remote procedure call (RPC) interface protocol.

In accordance with a second aspect of the present disclosure, a data storage system is provided. The data storage system includes a control device, a storage device corresponding to the control device and a storage server. The control device includes a host interface, a peer interface, a storage unit interface, a processor and a data management module. The host interface is configured to communicate and connect with a storage server for data interaction with the storage server, and the data interaction includes receiving data management instruction from the storage server. The peer interface is configured for data communication connection with a storage unit of an adjacent control device in the data storage system. The storage unit interface is configured to connect a storage unit. The data management module is configured to manage the data of the storage unit based on the data management instruction via the processor. The host interface is configured to send result data of local data management to the storage server.

In some embodiments, the control device is connected with the storage server via network.

In some embodiments, the data storage system includes two or more control devices.

In some embodiments, the storage device includes a SATA hard drive and/or an SSD.

In the embodiments of the present disclosure, a dedicated control device is set up for the storage device of the data storage system. The control device includes a processor and a local data management module, and through the connection with a storage server, the data in the storage device can be locally processed according to the data management instruction of the storage server. In this manner, the computing process of data management of the whole data storage system can be designed as distributed, that is, apart from the data management processing capability of storage server, the control device is able to perform partial processing functions in data management. Through operations by the control device such as query, classification, analysis, hash computation, and data conversion of the data in storage device, the storage server may receive data which have been pre-processed by the control device. In the embodiments of the present disclosure, it is not necessary to transmit all the data to the storage server for data management processing, thus effectively reducing the load of storage service. Even if the storage device of the data storage system is of a large magnitude, as the control device corresponding to the storage device is able to bear a certain amount of data management processing, the performance of the data storage will not be degraded due to excessive load.

Moreover, in the embodiments of the present disclosure, the data transmitted to storage server are locally pre-processed (local data management), which differs transmitting all data to the storage server for data management processing as implemented in prior art. Therefore, this can effectively decrease the load of data transmission of the whole data storage system, and the performance of data management of the data storage system can be further increased.

Moreover, the control device of the embodiments of the present disclosure further includes a storage unit interface adaptive to different storage units, whereby the compatibility of data storage system can be effectively improved.

BRIEF DESCRIPTION OF THE DRAWINGS

To describe technical solutions in embodiments of the present disclosure or in the related art more clearly, the following briefly introduces the accompanying drawings required for describing the embodiments or the related art. Apparently, the accompanying drawings in the following description illustrate merely some embodiments of the present disclosure. Those of ordinary skill in the art may also obtain other drawings based on these accompanying drawings without creative efforts.

DETAILED DESCRIPTION

In order to enable those skilled in the art to better understand solutions of the present disclosure, technical solutions in embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those of ordinary skill in the art based on the embodiments of the present disclosure without creative efforts shall fall within the protecting scope of the present disclosure.

Through research, the inventor found that the performance and efficiency of data storage system is constantly decreasing as the amount of data is increasing. The reason is that the constantly increasing data also accordingly increase the processing load of storage server in data storage system. Moreover, the constantly increasing data also accordingly increase the number of storage units and the data transmission load of the whole data storage system network, thereby reducing the performance of data management of the whole data storage system.

Figure 1:
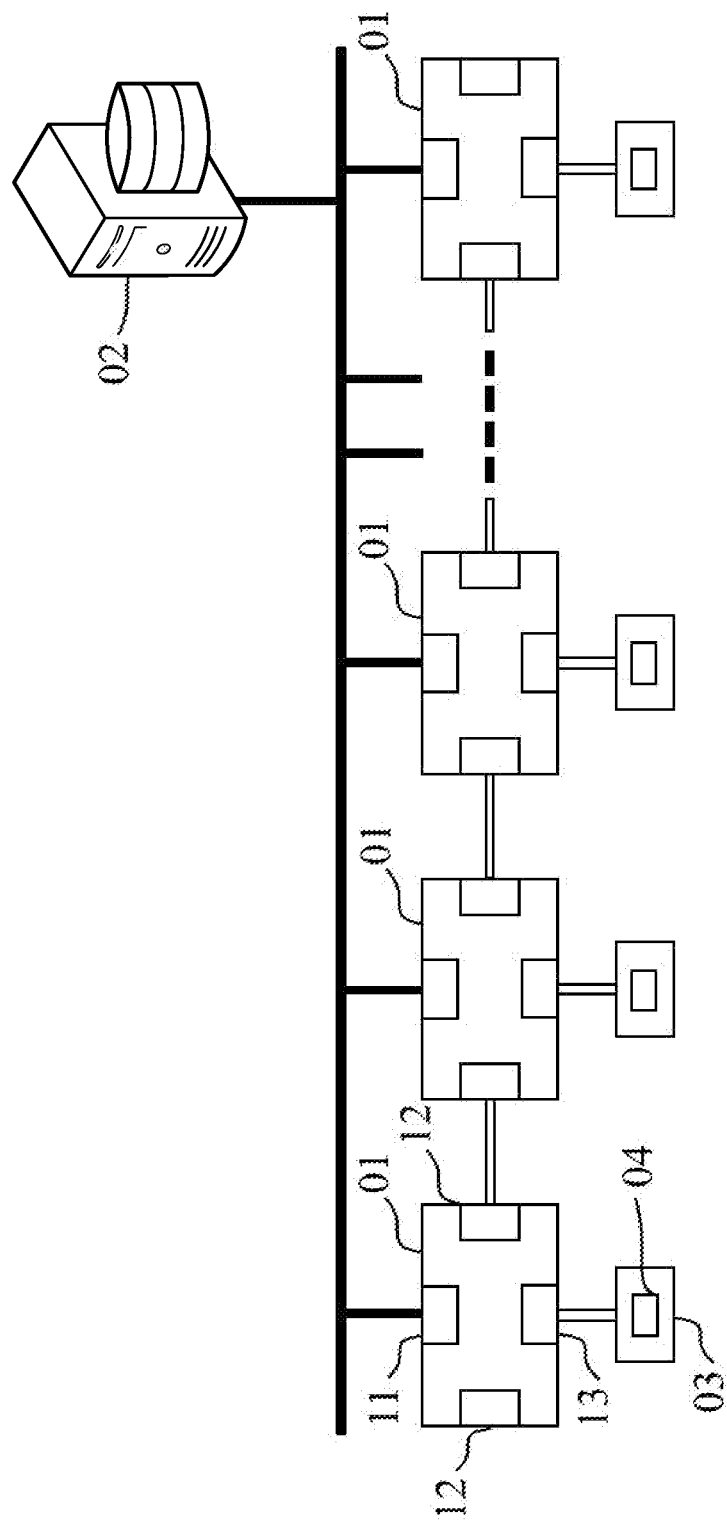
FIG. 1 is a schematic structural diagram of a data storage system in accordance with some embodiments of the present disclosure.
Figure 2:
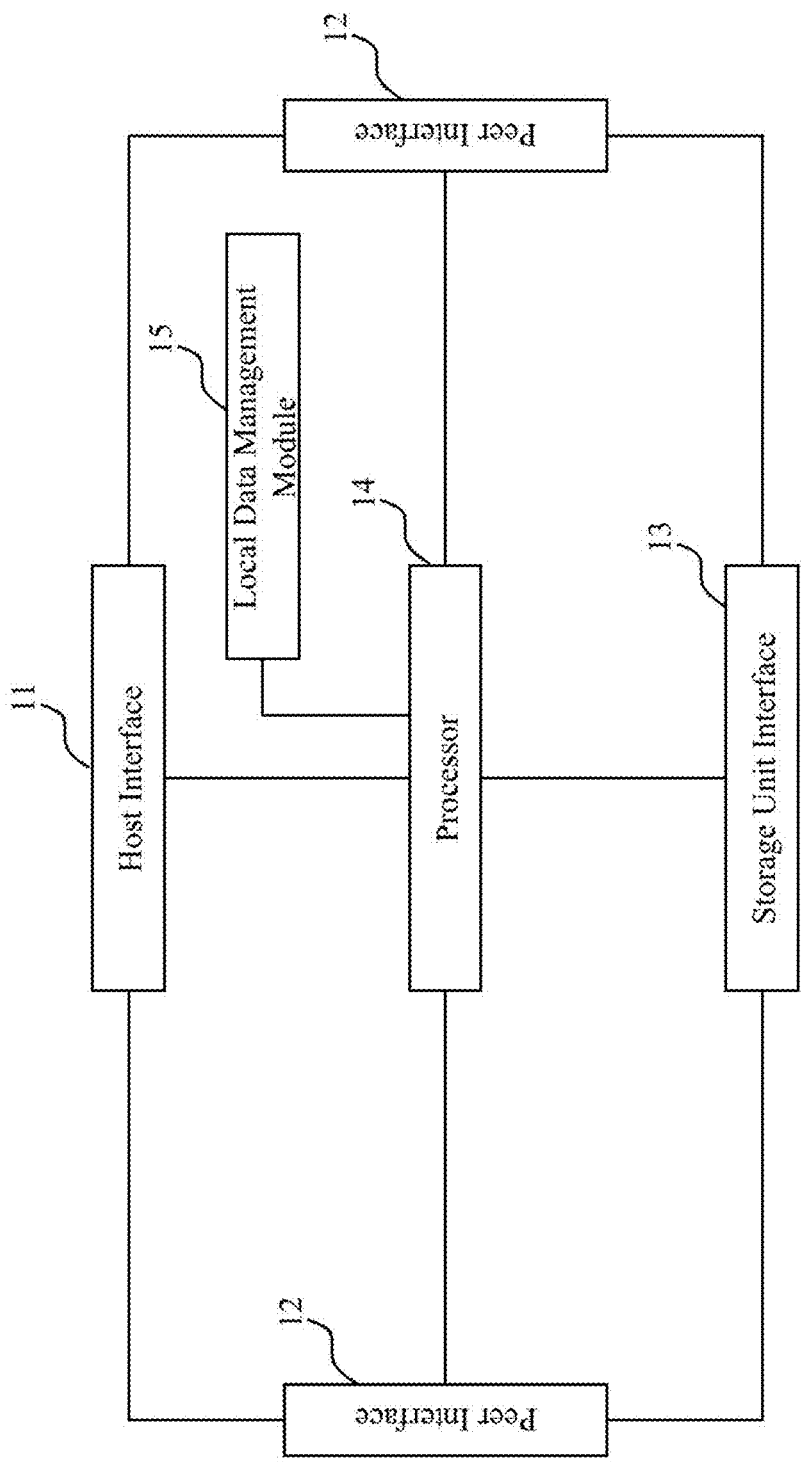
FIG. 2 is another schematic structural diagram of a data storage system in accordance with some embodiments of the present disclosure.

Based on the knowledge above, in order to increase the performance and efficiency of data storage system, the embodiments of the present disclosure provide a control device of data storage system 01, referring to FIG. 1 and FIG. 2, the control device 01 includes a host interface 11, a peer interface 12, a storage unit interface 13, a processor 14 and a local data management module 15.

The host interface 11 is connected and communicated with storage server 02, and configured for data interaction with the storage server 02. The data interaction includes receiving data management instructions of the storage server 02.

The peer interface 12 is configured for data communications connection with a storage unit of an adjacent control device in the data storage system.

The storage unit interface 13 is configured to connect the storage unit 03.

The local data management module 15 is configured for local data management of the data in the storage unit 03 according to the data management instruction via the processor 14. The local data management includes one or any combination of operations of query, classification, analysis, hash computation, and data conversion of data.

The host interface 11 is configured to send result data of local data management to the storage server 02.

In the embodiments of the present disclosure, the core idea is to design the data management process of the entire data storage system to be distributedly implemented in one or more servers and terminals. Specifically, part of the processing can be performed by the storage server 02 (as a server), the other part of the processing can be performed by the control device 01 (as a terminal). For example, local data management which can be performed by the control device 01 may include query, classification, analysis, hash computation, and data conversion of data. In other words, the data management and processing operations are not performed by the storage server 02.

It should be noted that the data processing methods of local data management as described in the present disclosure (query, classification, analysis, hash computation, and data conversion) are only typical examples of specific applications of data management processing performed by the control device 01, and not limited herein. Persons having ordinary skills in the art can design the processing functionality of the local data management module 15 based on actual needs, the design shall fall into the protecting scope of the embodiments of the present disclosure.

In practical applications, the data storage system of the embodiments of the present disclosure includes a storage server 02, a storage unit 03 and a control device 01. The control device 01 is connected with the storage unit 03 in near field through a storage unit interface (e.g., PCIe interface, SAS interface and/or SATA interface). The storage server 02 can be remotely connected with the control device 01 through network (the specific connection method may include connection through PCIe interface or NVMe interface). The whole data storage system may include a plurality of control devices 01, on one hand each control device 01 is connected with a storage device 03 to which the control device 01 belongs, on the other hand, each control device 01 may be connected with 2 adjacent peer control devices respectively through 2 peer interfaces (e.g., SAN interface). In this manner, each control device 01 is able to acquire data fast from a plurality of storage units of the whole data storage system.

As known from above description, in the embodiments of the present disclosure, setting a dedicated control device for a storage device of a data storage system, the control device includes a processor and a local data management module. Through the connection with a storage server, the control device is able to locally process data in the storage device according to the data management instruction of the data storage server. In this manner, the computing and processing procedure of the data management of the whole data storage system can be distributedly designed. In other words, apart from the processing capability of the storage server to manage data, the control device can perform partial functionality for data management. The data in the storage device can be filtered, queried, classified, analyzed, hash computed and data converted through the control device, and thus the storage server can receive the data which are preprocessed by the control device. In accordance with the embodiments of the present disclosure, not all data are required to be transmitted to the storage server for the data management process, therefore, the computing load of storage service can be effectively reduced. Even if the storage device of the data storage system is of a large magnitude, as the control device corresponding to the storage device can carry a certain amount of data management processing, the performance of the data storage server is not degraded due to overload.

Moreover, in accordance with the embodiments of the present disclosure, the data transmitted to the storage server are the data which are locally pre-processed (local data management), which differs from transmitting all data to the storage server for data management processing as implemented in the prior art. In other words, the amount of network data transmission can be reduced, which can effectively decrease the load of data transmission of the whole data storage system, whereby the performance of data management of the data storage system can be further increased.

Moreover, the control device of the embodiments of the present disclosure further includes a storage unit interface adaptive to different storage units, whereby the compatibility of data storage system can be effectively improved.

Figure 3:
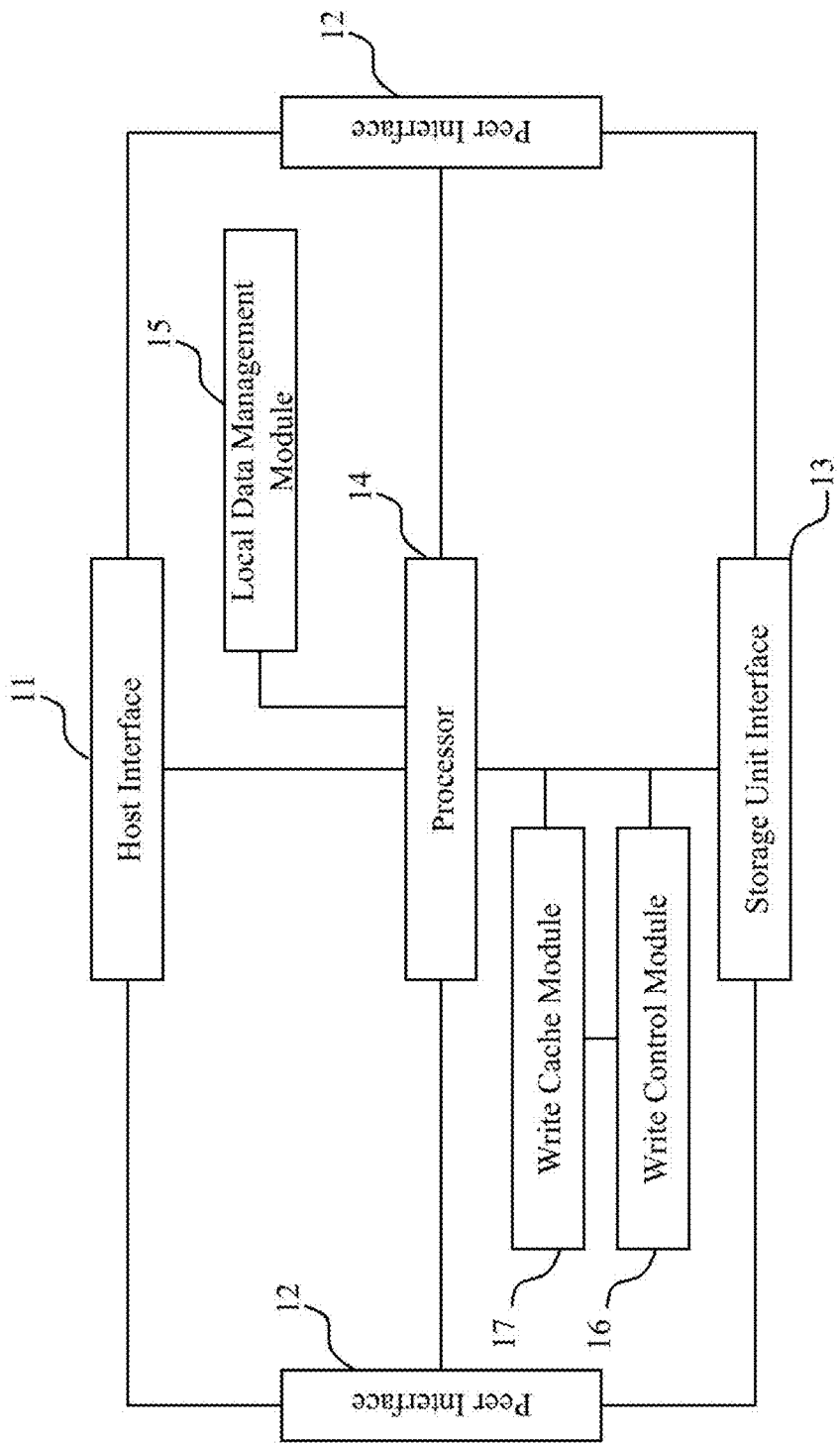
FIG. 3 is another schematic structural diagram of a data storage system in accordance with some embodiments of the present disclosure.
Figure 4:
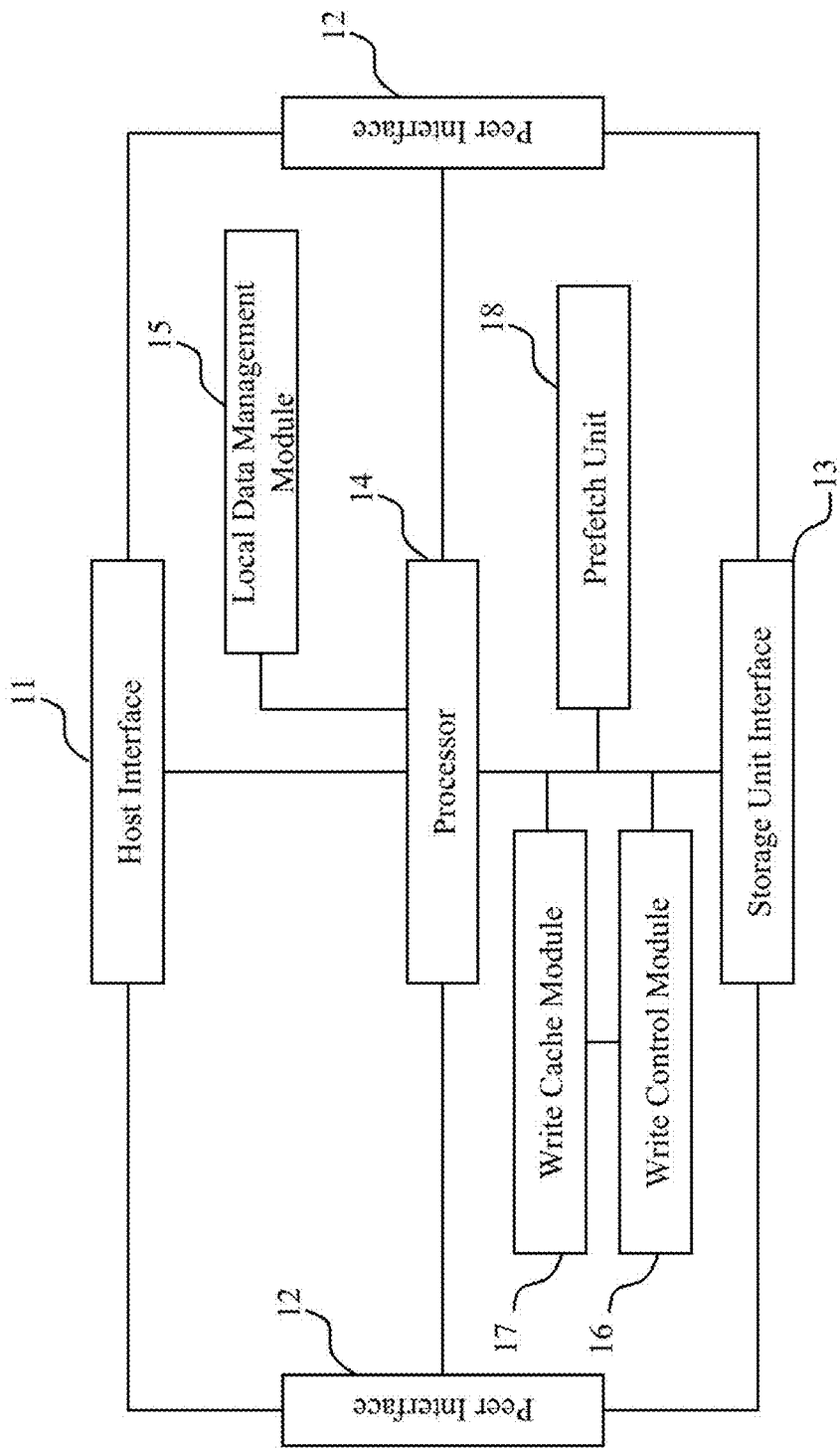
FIG. 4 is another schematic structural diagram of a data storage system in accordance with some embodiments of the present disclosure.
Figure 5:
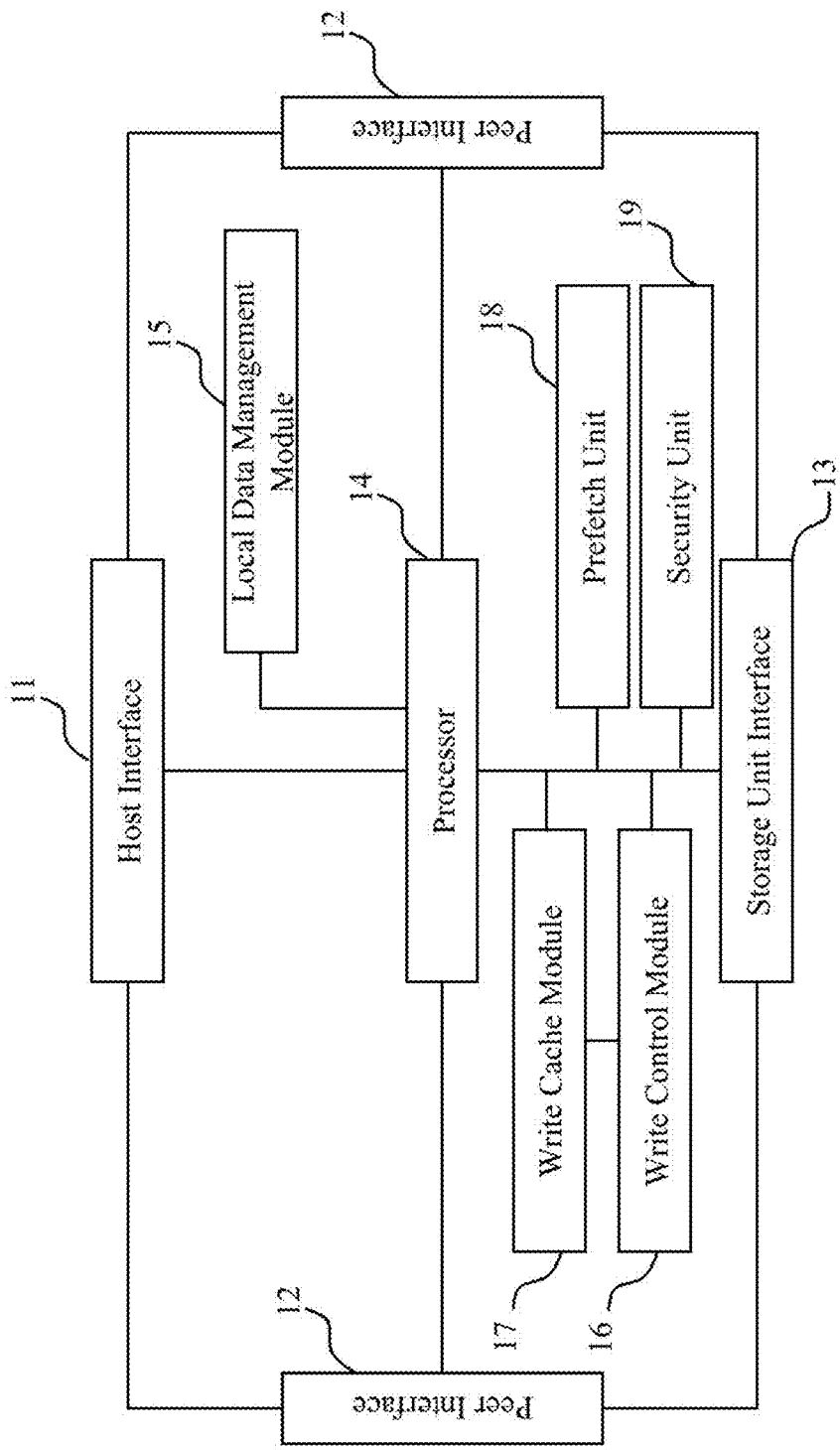
FIG. 5 is another schematic structural diagram of a data storage system in accordance with some embodiments of the present disclosure.

Preferably, in some embodiments of the present disclosure, as shown in FIG. 3, the control device can further include a write control unit 16 and a write cache module 17.

The write cache module 17 is configured to cache the data-to-be-written into solid state drive (SSD). The write control unit 16 includes a sort module (not shown in the figure), a replacement unit (not show in the figure) and a write module (not shown in the figure). The sort module is configured to sort the data-to-be-written in the write cache module 17 according to a least recently used page (LRU) algorithm. When the data storage amount of the write cache module 17 reaches a preset value, the sort module is also configured to determine a preset amount of replacement data among the infrequently used data-to-be-written according to a preset cache replacement algorithm. The write module is configured to write replacement data into the flash memory 04 of SSD.

In some embodiments of the present disclosure, preset a write cache module 17 which is configured to cache the data-to-be-written, in other words, data written to the SSD (data-to-be-written) are not directly written into the flash memory 04 of SSD, instead the data are first written into the write cache module 17.

The sort module is configured to rank the data-to-be-written in the write cache module 17 according to the LRU algorithm, thereby distinguishing the infrequently used data-to-be-written in the write cache module 17.

The idea of the embodiments of the present disclosure is, generally, the usage frequency (rewrite frequency) of active data pages is often relatively high. Therefore after being written into the write cache module, the active data pages will remain in the front of the sequence which is ranked according to the LRU algorithm. The rear of the sequence usually stores the data pages with relatively low rewrite frequency. Through write cache module and ranking, active data pages in the data-to-be-written can be distinguished, and relatively inactive data pages in the data-to-be-written can be distinguished. As the LRU algorithm depends on the usage frequency of data to rank, the relatively inactive data pages in the data-to-be-written can be referred to as the infrequently used data-to-be-written.

The capacity of the write cache module 17 is limited, and thus the write cache module is unable to store the data-to-be-written without limitation. Therefore, it is necessary to have a replacement mechanism set by the replacement unit to determine which data need to be written into the flash memory, and thus the data pages which are relatively less active may be transferred from the write cache module 17 to the flash memory 04 through the write unit, so as to spare space for subsequent data writing. Moreover, the final writing of data into the SSD is completed by transferring data from the write cache module 17 to the flash memory 04.

First, persons having ordinary skills in the art may set a predetermined value based on actual needs. The predetermined value may be a specific value or a percent value which indicates the usage percentage of the capacity of the write cache module, and the predetermined value is not intended to be limited specifically hereby. Taking the predetermined value of 80% as an example, when the data occupancy of the write cache module reaches 80% of the overall capacity of the write cache module, data replacement may be performed according to the cache replacement algorithm, and thus the inactive data pages in the write cache module may be cleared out from the write cache module. In other words, it is determining which of the data pages in the write cache module belongs to replacement data. It should be noted that, each time the amount of the data that are cleared out may be set by persons having ordinary skills in the art based on actual needs.

After the replacement data are determined, the write unit may be used to write the replacement data into the flash memory 04 of SSD. Due to the relatively low active frequency of the replacement data, after they are written into the flash memory 04, the possibilities that these data pages are rewritten may be relatively low, which can reduce the number of times of rewriting in the flash memory 04 as a whole, thus further reducing the issue of write amplification of the SSD during the data access.

In summary, in some embodiments of the present disclosure, the data-to-be-written are first written into the preset write cache module and ranked according to the LRU algorithm. In this way, the infrequently used data-to-be-written are at a bottom of a ranking sequence, and can be selected among the data-to-be-written and then be written into the flash memory of the SSD. Since the probability of these infrequently used data-to-be-written being rewritten frequently is low, the number of times of rewriting in the flash memory of the SSD can be effectively reduced, thereby decreasing effectively write operations on the flash memory and reducing write amplification of the SSD during data access.

Preferably, the write control unit 16 of the embodiments of the present disclosure may further include:

A grouping unit (not shown in the figure), configured to group data to be written, after caching the acquired data-to-be-written to the preset write cache module 17. The grouping rule includes grouping according to an interval at which the data-to-be-written are rewritten; a recording unit (not shown in the figure), configured to record page information of the data-to-be-written, and the page information includes group information of the data-to-be-written; a positioning unit (not shown in the figure), configured to determine a target data block in the flash memory 04 of the SSD according to group information of the replacement data prior to writing the replacement data into the flash memory 04 of SSD.

For example, each data block in the flash memory is 64K (kilobit), data pages marked with Group 001 are 128K, and data pages marked with Group 002 are 640K. In this case, the data pages marked with Group 001 are stored into two data blocks respectively, and the data pages marked with Group 002 are stored into ten data blocks respectively. In this way, data pages in each data block belong to the same group, that is, have the same or similar rewrite interval.

It can be seen from above that, in the implementations of the disclosure, the data-to-be-written are further grouped according to the rewrite interval of the data-to-be-written. By writing data of the same or similar rewrite interval into the same data block, each data block is made to include data pages with the same rewrite interval in general, thereby decreasing probability of a data block including a valid page and an invalid page at the same time. Since during block erasing, when pages of the data block are all invalid pages, it is unnecessary to conduct an extra write operation, that is, it is unnecessary to introduce an additional write operation due to transferring a valid page in the data block into another data block, write amplification can be further reduced.

Preferably, in some embodiments of the present disclosure, the control device further includes a prefetch unit 18, the prefetch unit 18 includes a hash table maintenance module (not shown in the figure), a data acquisition module (not shown in the figure), a first learning model (not shown in the figure) and a prefetch module (not shown in the figure).

The hash table maintenance module is configured to preset a hash table, and the hash table includes more than one hash value. The hash value is used to record and indicate data characteristic of data pages in SSD. The data characteristic includes accessing history data of data pages, current I/O operation type and address of data pages, access frequency of data pages, re-reference interval of data pages, data group of data pages, and the file name, the file type and the file size of the file which to data pages belong. The data acquisition module is configured to acquire I/O data flow of SSD, and acquire the hash value corresponding to the I/O data flow in the hash table. The first learning model is configured to predict data-page-to-be-visited and/or data page sequence. The first learning model is input with data characteristic in the first data characteristic set as input, the first data characteristic set being a set of data characteristics required to acquire prediction result of the first learning model, the data characteristic of the first data characteristic set being acquired according to the hash value. The prefetch module is configured to prefetch data in SSD based on output result of the first learning model.

The hash table maintenance module may record data characteristics of data pages in SSD through the records from the hash table maintenance unit. When the data acquisition unit acquires real-time data flow, the data-page-to-be-visited predicted by the first learning model can be analyzed, and therefore the prefetch unit may prefetch data based on the prediction result of the first learning model. In accordance with the embodiments of the present disclosure, when predicting prefetching data, real time learning for adapting to different application categories and visiting modes is possible, and thus better data prefetch performance may be achieved.

Further, in some embodiments of the present disclosure, the prefetch unit 18 may further include a second learning model (not shown in the figure) and a determination unit (not shown in the figure), specifically:

The second learning model is configured to group the data-to-be-written, and the grouping methods may include grouping the data-to-be-written into different groups based on the approximation of the rewriting time of the data-to-be-written. The second learning model takes data characteristics of a second data characteristic set as input, and the second data characteristic set is a set of data characteristics needed to acquire the prediction result of the second learning model. The data characteristic of the second data characteristic set is acquired based on the hash value. The determination unit is configured to determine target data blocks in SSD for the data-to-be-written based on the group information of the data-to-be-written.

Likewise, the data characteristics of data pages in SSD are recorded through the records of the hash table maintenance unit. When the data acquisition unit acquires real time data flow, by grouping the data-to-be-written through the second learning model, a single data block in SSD only includes data pages from a same group. Due to the approximation of rewriting time of data pages with a same group, the case of both valid and invalid pages in a single data block at the same time can effectively be avoided, and therefore the issue of write amplification of SSD can be decreased effectively.

Preferably, in some embodiments of the present disclosure, the control device further includes a security unit 19, the security unit 19 includes a sensitive data acquisition module (not shown in the figure) and an encryption/decryption module (not shown in the figure).

The sensitive data acquisition module is configured to acquire sensitive data during data interaction with storage server, the sensitive data including data conforming to predetermined characteristic. The encryption/decryption module includes a data security module adaptive to an encryption/decryption module of storage server.

In practical applications, the processor of the embodiments of the present disclosure is configured to receive a service request for data management from storage server via a remote procedure call (RPC) interface protocol.

In some embodiments of the present disclosure, in order to increase data security, the control device may further include a security unit 19. Due to the embodiments of the present disclosure, the storage device for data storage is set up with a control device in the front end, and thus data security can be increased by setting a security unit, whereby illegal invasion of data during data transmission in the internet can be prevented. In practical applications, only specific data are protected by determining whether data flow includes sensitive data, and it is not necessary to encrypt/decrypt all the data, whereby the effects brought by encryption/decryption to data transmission may be reduced effectively. Specifically, the security unit 19 includes a sensitive data acquisition module and an encryption/decryption module. Accordingly, the security unit included in one end of the storage server may adaptively include a module for recognizing sensitive data and an encryption/decryption module. In this manner, the data which are determined as sensitive data by the control device and the storage server collectively may be encrypted before transmission and decrypted after transmission, and thus data security is increased while the effects on data transmission are minimized as much as possible.

On a second aspect of the embodiments of the present disclosure, a data storage system is provided. Referring to FIG. 1 to FIG. 5, the data storage system includes a control device 01, a storage device 03 corresponding to the control device, and a storage server 02.

The control device 01 includes a host interface 11, a peer interface 12, a storage unit interface 13, a processor 14, and a data management module 15.

The host interface 11 is connected and communicated with the storage server 02 for data interaction with the storage server 02. The data interaction includes receiving data management instruction from the storage server 02. The peer interface 12 is configured for communications connection of data with a storage unit 02 of an adjacent control device in the data storage system. The storage unit interface 13 is configured to connect a storage unit 03. The data management module 15 is configured for data management of data in the storage unit 03 based on the data management instruction via the processor 14. The host interface 11 is configured to send result data of data management to the storage server 02. The control device 01 is connected with the storage server 02 via network.

The architecture of the data storage system in the embodiments of the present disclosure, is primarily about a control device set up in the front end of storage unit for the predetermined computing and processing of data management functions, and thus the computing and processing procedure of the data management of the whole data storage system can be distributedly designed. In other words, apart from the processing capability of storage server to manage data, the control device is able to perform partial processing functionality for data management. The data in the storage device can be filtered, queried, classified, analyzed, hash computed, data converted, or otherwise processed through the control device, and thus the storage server can receive data which are preprocessed by the control device. In accordance with the embodiments of the present disclosure, not all data are required to transmitted to the storage server for the data management process, therefore, the computing load of storage service can be effectively reduced. Even if the storage device of the data storage system is of a large magnitude, as the control device corresponding to the storage device can carry a certain amount of data management, the performance of the data storage server is not degraded due to overload. The technical solutions, working principals, and technical advantages have been described in the embodiments of the control device of data storage system in FIG. 1, and thus are omitted herein.

In order for a requirement of large storage volume, in practical applications, the data storage system may include two or more control devices. In this manner, a data storage system may distributedly control a plurality of control devices via a storage server, whereby the storage capacity of the whole storage system can be increased significantly.

In practical applications, the storage device of the embodiments of the present disclosure may include a SATA hard drive and an SSD. In other words, the storage unit interface may be configured to adapt to different storage units, so as to effectively increase the compatibility of the data storage system.

It will be appreciated that the systems, apparatuses, and methods disclosed in embodiments herein may also be implemented in various other manners. For example, the above apparatus embodiments are merely illustrative, e.g., the division of units (including sub-units) is only a division of logical functions, and there may exist other ways of division in practice, e.g., multiple units (including sub-units) or components may be combined or may be integrated into another system, or some features may be ignored or not included. In other respects, the coupling or direct coupling or communication connection as illustrated or discussed may be an indirect coupling or communication connection through some interface, device or unit, and may be electrical, mechanical, or otherwise.

Separated units (including sub-units) as illustrated may or may not be physically separated. Components or parts displayed as units (including sub-units) may or may not be physical units, and may reside at one location or may be distributed to multiple networked units. Some or all of the units (including sub-units) may be selectively adopted according to practical needs to achieve desired objectives of the disclosure.

Additionally, various functional units (including sub-units) described in embodiments herein may be integrated into one processing unit or may be present as a number of physically separated units, and two or more units may be integrated into one. The integrated units above can be implemented by means of hardware or as software functional units.

If the integrated units are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. Computer software products can be stored in a storage medium and may include multiple instructions that, when executed, can cause a computing device, e.g., a personal computer, a server, a second adapter, a network device, etc., to execute some or all operations of the methods as described in the various embodiments. The above storage medium may include various kinds of media that can store program code, such as a universal serial bus (USB) flash memory disk, a mobile hard drive, a read-only memory (ROM), a random access memory (RAM), a resistive random access memory (ReRAM), a magnetoresistive random access memory (MRAM), a phase-change memory (PCM), a NAND flash memory, a NOR flash memory, a memristor, a magnetic disk, or an optical disk.

While the disclosure has been described in detail in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

In summary, the above embodiments are used to describe the technical solutions of the present disclosure, and do not intend to limit herein. While the present has been described in detail referring to the embodiments above, persons having ordinary in the art should understand, various modifications and equivalent arrangements of the technical solutions of the above embodiments may be conducted. However, the modifications and equivalent arrangements may not depart from the protecting scope and spirit of the present disclosure.

What is claimed is:

1. A system for data storage, comprising:
    a storage server;
    a plurality of storage units;
    a network; and
    a plurality of control devices corresponding to the plurality of storage units, each of the plurality of control devices being independent from a respective one of the plurality of storage units,
    wherein each control device comprises a host interface, a first storage unit interface, a first peer interface, a write cache module, a processor, and a memory;
    the host interface is connected to and configured to communicate with the storage server via the network;
    the first storage unit interface is connected to and configured to communicate with the respective one of the plurality of storage units;
    the first peer interface is connected to and configured to communicate with an adjacent control device from the plurality of control devices, the adjacent control device having a second peer interface for communication with the first peer interface of the control device, wherein the control device is configured to establish data communications with a storage unit corresponding to the adjacent control device via the first peer interface, the second peer interface, the adjacent control device, and a second storage unit interface of the adjacent control device;
    the write cache module is for caching data-to-be-written into the respective one of the plurality of storage units, the cached data comprising active data pages with various usage frequencies; and
    the memory communicatively ja coupled to the processor, the memory comprises program instructions that, when executed by the processor, cause the processor to:
        cache the data-to-be-written in the write cache module;
        determine whether a data storage amount of the write cache module reaches a preset value;
        responsive to that the data storage amount of the write cache module reaches the preset value, determine replacement data that comprises active data pages with lower usage frequencies; and
        write the replacement data into a flash memory of the respective storage unit.

2. The system of claim 1, wherein each of the storage units comprises at least one of a SATA hard drive or a solid-state drive (SSD).

3. The system of claim 1, wherein
    the host interface comprises at least one of PCIe interface, SAS interface, SATA interface, RAPID-IO interface, or NVMe interface;
    the first peer interface comprises at least one of Ethernet interface, FC interface, iSCSI interface, or SAN interface; and
    the first storage unit interface comprises at least one of PCIe interface, SAS interface, SCSI interface, or SATA interface.

4. The system of claim 1, wherein the program instructions, when executed by the processor, further cause the processor to:
    group the data-to-be-written based on an interval at which the data-to-be-written is rewritten; and
    determine a target data block in the flash memory for storing the data-to-be-written based on the grouping.

5. The system of claim 4, wherein the program instructions, when executed by the processor, further cause the processor to record page information of the data-to-be-written.

6. The system of claim 5, wherein the page information comprises group information of the data-to-be-written.

7. The system of claim 4, wherein data pages in the target data block belong to a same group and have a same rewrite interval.

8. The system of claim 1, wherein the program instructions, when executed by the processor, further cause the processor to:
    preset a hash table including one or more hash values corresponding to data characteristics of data pages in the respective storage unit;
    acquire an input/output (I/O) data flow of the respective storage unit and the hash value corresponding to the I/O data flow in the hash table;
    predict a data-page-to-be-accessed based on a learning model, the learning model being input with a set of data characteristics acquired based on the hash value corresponding to the I/O data flow in the hash table; and
    prefetch data in the respective storage unit based on the predicted data-page-to-be-accessed.

9. The system of claim 8, wherein the learning model is configured to predict data page sequence.

10. The system of claim 1, wherein the program instructions, when executed by the processor, further cause the processor to:
    acquire sensitive data during data interaction with the storage server; and
    encrypt the acquired sensitive data.

11. The system of claim 1, wherein the program instructions, when executed by the processor, further cause the processor to receive a service request of the storage server for data management via a remote procedure call (RPC) interface protocol.

12. The system of claim 1, wherein the preset value is a specific numerical value.

13. The system of claim 1, wherein the preset value is a percentage value that indicates a usage percentage of a capacity of the write cache module.

14. A control device for controlling a first storage unit of a data storage system, the control device being one of a plurality of control devices that correspond to a plurality of storage units included in the data storage system, and each of the plurality of control devices being independent from a respective one of the plurality of storage units,
wherein the control device comprises a host interface, a first storage unit interface, a first peer interface, a write cache module, a processor, and a memory;
the interface is configured to communicate with a storage server managing the data storage system;
the first storage unit interface is configured to communicate with the first storage unit from the plurality of storage units;
the first peer interface is configured to communicate with a second storage unit of an adjacent control device in the data storage system, the adjacent control device having a second peer interface for communication with the first peer interface of the control device, wherein the control device is configured to establish data communications with the second storage unit corresponding to the adjacent control device via the first peer interface, the second peer interface, the adjacent control device, and a second storage unit interface of the adjacent control device;
the write cache module is for caching data-to-be-written into the first storage unit, the cached data comprising active data pages with various usage frequencies; and
the memory communicatively is coupled to the processor, the memory comprises program instructions that, when executed by the processor, cause the processor to:
cache the data-to-be-written in the write cache module;
determine whether a data storage amount of the write cache module reaches a preset value;
responsive to that the data storage amount of the write cache module reaches the preset value, determine replacement data that comprises active data pages with lower usage frequencies; and
write the replacement data into a flash memory of the respective storage unit.

15. The control device of claim 14, wherein
the host interface comprises at least one of PCIe interface, SAS interface, SATA interface, RAPID-IO interface, or NVMe interface;
the first peer interface comprises at least one of Ethernet interface, FC interface, iSCSI interface, or SAN interface; and
the first storage unit interface comprises at least one of PCIe interface, SAS interface, SCSI interface, or SATA interface.

16. The control device of claim 14, wherein the program instructions, when executed by the processor, further cause the processor to:
group the data-to-be-written based on an interval at which the data-to-be-written is rewritten; and
determine a target data block of the flash memory for storing the data-to-be-written based on the grouping.

17. The control device of claim 14, wherein the program instructions, when executed by the processor, further cause the processor to:
preset a hash table including one or more hash values corresponding to data characteristics of data pages in the storage unit;
acquire an input/output (I/O) data flow of the storage unit and the hash value corresponding to the I/O data flow in the hash table;
predict a data-page-to-be-accessed based on a learning model, the learning model being input with a set of data characteristics acquired based on the hash value corresponding to the I/O data flow in the hash table; and
prefetch the data in the storage unit based on the predicted data-page-to-be-accessed.

18. The control device of claim 17, wherein the data characteristics include accessing history data of the data pages, current I/O operation type and address of the data pages, access frequency of the data pages, re-reference interval of the data pages, data group of the data pages, file name, file type, or file size of the file to which the data pages belong.

19. The control device of claim 14, wherein the program instructions, when executed by the processor, further cause the processor to:
acquire sensitive data during data interaction with the storage server; and
encrypt the acquired sensitive data.

20. The control device of claim 14, wherein the program instructions, when executed by the processor, further cause the processor to receive a service request of the storage server for data management via a remote procedure call (RPC) interface protocol via the host interface.

* * * * *